(12) United States Patent
Sanjeliwala et al.

(10) Patent No.: US 10,983,916 B2
(45) Date of Patent: Apr. 20, 2021

(54) CACHE STORAGE

(71) Applicant: ARM Limited, Cambridge (GB)

(72) Inventors: Huzefa Moiz Sanjeliwala, Austin, TX (US); Klas Magnus Bruce, Leander, TX (US); Leigang Kou, Austin, TX (US); Michael Filippo, Driftwood, CA (US); Miles Robert Dooley, Austin, TX (US); Matthew Andrew Rafacz, Austin, TX (US)

(73) Assignee: ARM Limited, Cambridge (GB)

( * ) Notice: Subject to any disclaimer, the term of this patent is extended or adjusted under 35 U.S.C. 154(b) by 153 days.

(21) Appl. No.: 15/446,235

(22) Filed: Mar. 1, 2017

(65) Prior Publication Data

US 2018/0253387 A1    Sep. 6, 2018

(51) Int. Cl.
*G06F 12/00* (2006.01)
*G06F 12/0897* (2016.01)
*G06F 12/0862* (2016.01)

(52) U.S. Cl.
CPC ...... *G06F 12/0897* (2013.01); *G06F 12/0862* (2013.01); *G06F 2212/1028* (2013.01); *G06F 2212/1041* (2013.01); *G06F 2212/60* (2013.01)

(58) Field of Classification Search
CPC ............... G06F 12/12; G06F 12/0897; G06F 2212/1041; G06F 2212/608
See application file for complete search history.

(56) References Cited

U.S. PATENT DOCUMENTS

| | | | | | |
|---|---|---|---|---|---|
| 2007/0266206 | A1* | 11/2007 | Kim | ............ | G06F 12/0877 711/118 |
| 2014/0189245 | A1* | 7/2014 | Rupley | ............ | G06F 12/0808 711/133 |
| 2014/0317357 | A1* | 10/2014 | Kaplan | ............ | G06F 12/0802 711/137 |

* cited by examiner

*Primary Examiner* — Gurtej Bansal
(74) *Attorney, Agent, or Firm* — Nixon & Vanderhye P.C.

(57) ABSTRACT

A data processing apparatus is provided that includes a plurality of storage elements. Receiving circuitry receives a plurality of incoming data beats from cache circuitry and stores the incoming data beats in the storage elements. At least one existing data beat in the storage elements is replaced by an equal number of the incoming data beats belonging to a different cache line of the cache circuitry. The existing data beats stored in said plurality of storage elements form an incomplete cache line.

19 Claims, 4 Drawing Sheets

CACHE STORAGE

TECHNICAL FIELD

The present disclosure relates to data processing. More particularly, it relates to storage by caches.

DESCRIPTION

When a miss occurs in a cache, a cache line including that data is fetched from a lower level of the memory hierarchy such as another cache or a main memory. When the interface between the caches is small, the cache line might have to be returned in multiple cycles. Data beats that have been received can be stored in the cache such as a data miss buffer. Often it is desirable to allow multiple misses to be handled simultaneously, otherwise subsequent memory access requests must wait while data from a previous request is fetched. However, as the number of misses that can be simultaneously handled is increased, the storage requirements of the data miss buffer also increase. This leads to an increase in circuit size and power consumption.

SUMMARY

Viewed from a first example configuration, there is provided a data processing apparatus comprising: a plurality of storage elements; and receiving circuitry configured to receive a plurality of incoming data beats from cache circuitry and to store said incoming data beats in said storage elements, wherein at least one existing data beat in said storage elements is replaced by an equal number of said incoming data beats belonging to a different cache line of said cache circuitry; and said existing data beats stored in said plurality of storage elements form an incomplete cache line.

Viewed from a second example configuration, there is provided a data processing system comprising: cache circuitry comprising a plurality of cache lines; load/store circuitry comprising: a plurality of storage elements; and receiving circuitry configured to receive a plurality of incoming data beats from said cache circuitry and to store said incoming data beats in said storage elements, wherein at least one existing data beat in said storage elements is replaced by an equal number of said incoming data beats belonging to a different cache line of said cache circuitry; and said existing data beats stored in said plurality of storage elements form an incomplete cache line.

Viewed from a third example configuration, there is provided a method comprising: receiving a plurality of incoming data beats from cache circuitry; and storing said incoming data beats in a plurality of storage elements, wherein at least one existing data beat in said storage elements is replaced by an equal number of said incoming data beats belonging to a different cache line of said cache circuitry; and said existing data beats stored in said plurality of storage elements form an incomplete cache line.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
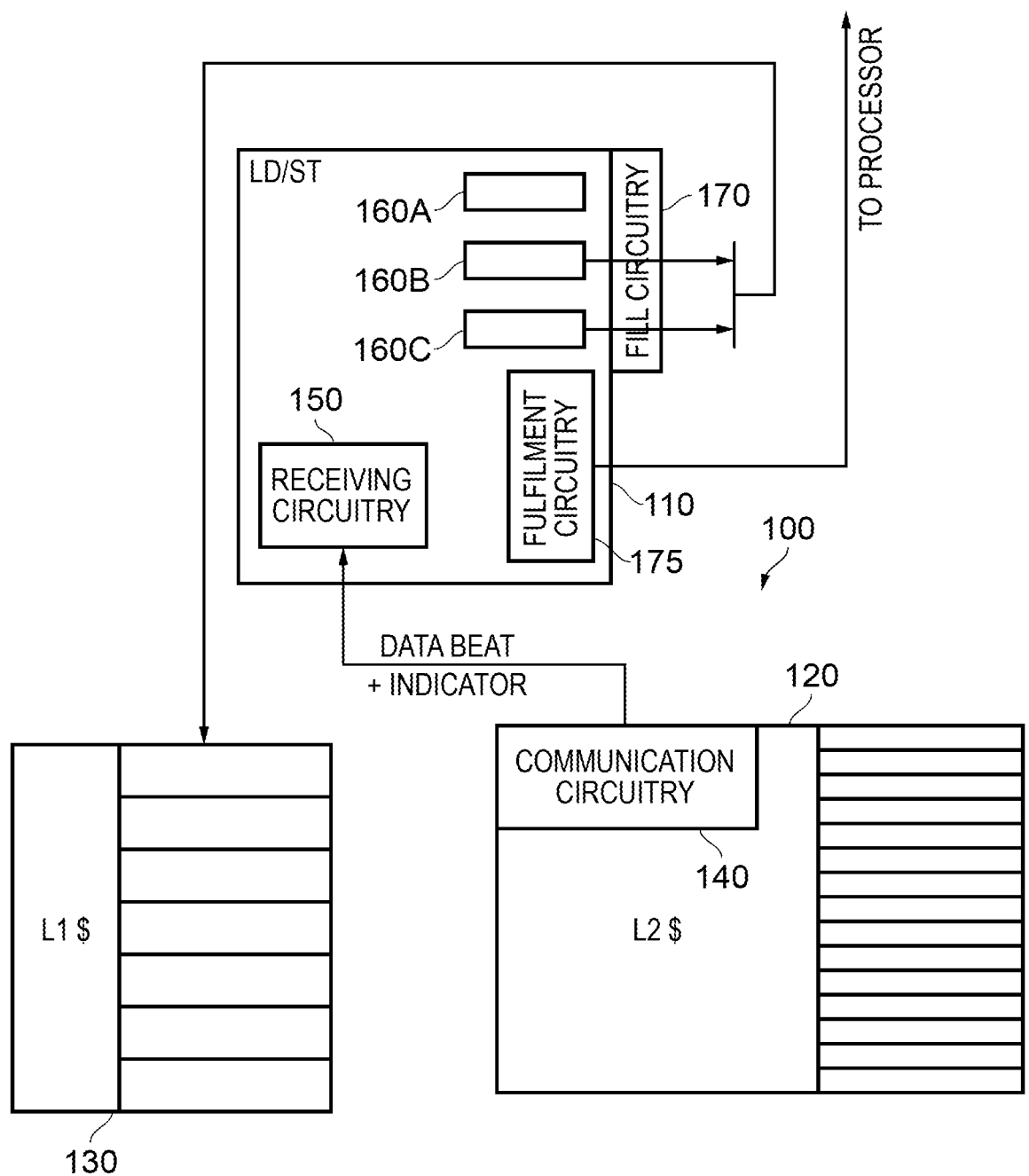
FIG. 1 schematically illustrates a system comprising a data processing apparatus in accordance with one embodiment.

Before discussing the embodiments with reference to the accompanying figures, the following description of embodiments is provided.

In accordance with one example configuration there is provided a data processing apparatus comprising: a plurality of storage elements; and receiving circuitry configured to receive a plurality of incoming data beats from cache circuitry and to store said incoming data beats in said storage elements, wherein at least one existing data beat in said storage elements is replaced by an equal number of said incoming data beats belonging to a different cache line of said cache circuitry; and said existing data beats stored in said plurality of storage elements form an incomplete cache line.

A data beat (also referred to as a data chunk) is a unit of data that is received at a time such as a cycle. Each data beat may form part of a cache line. If the maximum amount of data that can be received across the interface is smaller than the size of a cache line, then the entire cache line will take a number of cycles in order to be fully received. In accordance with the above, when a data beat is received, it is stored in one of the storage elements. The storage elements could, for example, be registers. In the example configuration, it is possible for a partially full cache line that is stored in the storage elements to be replaced by incoming data beats belonging to a different cache line (e.g. before being written out). For example, as opposed to waiting for the partially full cache line to be completed, the data beats making up the partially full cache line are replaced by other data beats belonging to a different cache line. This may occur over a number of cycles. In some embodiments, "replacement" takes the form of overwriting while in other embodiments "replacement" simply involves discarding the existing data and storing the new data (possibly in a different one of the storage elements). The same replacement policy does not apply to complete cache lines, which may be written out first. This technique does not necessitate waiting for an entire line to be received before data beats from other lines can be received. Indeed, rather than storage being allocated for a particular cache line until all of that cache line is received, the storage could instead be allocated to a different cache line. For the avoidance of doubt, it need not be the case that every partially complete cache line will be always replaced or that such replacement happens immediately.

In some embodiments, the data processing apparatus comprises fill circuitry to cause, in response to receiving all data beats belonging to a single cache line, said single cache line to be stored in further cache circuitry and said all data beats belonging to a single cache line to be removed from said plurality of storage elements. In such embodiments, the fill circuitry moves a cache line from the plurality of storage elements once it has been received to further cache circuitry. This movement could take the form of filling the further cache circuitry with the cache line and evicting the cache line from the storage elements. Data beats that have been written out in this way can then be replaced by data beats belonging to a different cache line.

In some embodiments, said fill circuitry is configured to perform non-stop filling once said cache circuitry has acquired all data beats belonging to a cache line from when said cache circuitry transmits a first data beat belonging to said cache line until said cache circuitry transmits a last data beat belonging to said cache line.

In some embodiments, said storage elements consist of a number of storage elements necessary to store a single cache line. A sufficient number of storage elements are included so that a single cache line can be stored in its entirety at a time. Consequently, an entire cache line can be written out at once. By including this many storage elements and no more, the size of the circuitry can be reduced or even minimised. Note that this limit may only apply to the storage elements that are checked against incoming data beats. Further storage elements could be included, e.g. into which incoming data can be received. Such further storage elements are not checked against incoming data and fill circuitry may not output data from the further storage elements. Alternatively, data could be received directly into one of the storage elements.

In some embodiments, said cache circuitry is at the level of a L2 cache or lower in a memory hierarchy; and said further cache circuitry is a L1 cache. In a memory hierarchy, a level two (L2) cache is typically larger and slower than a level one (L1) cache. Most frequently accessed data can therefore be stored in the faster level one cache. Once this becomes full, data can be evicted into the level two cache. However, if data in the level two cache is subsequently required (e.g. due to a miss occurring in the level one cache) then this data is retrieved from the level two cache (e.g. in a series of data beats) and then filled into the level one cache. A similar situation exists when data is fetched from below the level two cache, which such circuitry being slower and larger than the level two cache. Typically, elements below the level two cache also operate at a lower clock frequency than the level two cache (or above). Consequently, it can take several cycles to receive each data beat received from memory components below the level two cache.

In some embodiments, said plurality of storage elements comprises a staging element; and when said incoming data beat is stored, it is firstly stored in said staging element before being moved to another of said plurality of storage elements. In this way, a data beat is received into the staging element before it is moved into a different one of the storage elements. The different one of the storage elements will depend on whether the received data beat is replacing or being stored alongside an existing data beat. The movement of the data beat could occur in a subsequent cycle after being received. In some embodiments, at each cycle, each data beat is sequentially moved along one storage element.

In some embodiments, said plurality of storage elements consists of said staging element and a set of further storage elements, wherein said set of further storage elements is configured to store a single cache line from said cache circuitry. For example, the further storage elements could be configured to store only one cache line from the cache memory. In this way, the number of storage elements can be reduced or even minimised to the number of storage elements required to store a cache line plus one data beat. This therefore enables an entire cache line to be temporarily stored as it is written out, and for an incoming data beat to be received so that a continual process of receiving data beats and/or writing out data beats can be provided. The further storage elements could, for example, store data beats that are compared against incoming data beats to determine if they are from the same cache line.

In some embodiments, each storage element stores a single data beat.

In some embodiments, each cache line in said cache circuitry comprises two data beats. In such embodiments, it can therefore take a period of two cycles for all the data in a single cache line to be received by the receiving circuitry of the data processing apparatus.

In some embodiments, said data beat comprises an instruction. The instruction may be fetched into an instruction cache prior to being executed. In other embodiments, said data beat comprises data, which may be fetched prior to being operated on.

In some embodiments, said existing data beat is a critical data beat. A critical data beat is a part of a cache line that contains a data value that has been explicitly requested. For example, if the processor requires access to a particular byte of data, a cache line containing that byte of data must be fetched. The cache line will therefore contain several bytes of data, all of which are fetched simultaneously. The cache line may be broken down into data beats in order to compensate for the fact that the cache line itself is too big for the external interface, i.e. the cache line is too big for all the data in the cache line to be received at once. Whichever of the data beats that contains the required data value is referred to as a critical data beat since it contains the data value that must be returned back to the processor. In these embodiments, even if the existing data beat is a critical data beat, it can still be overwritten if a data beat is received that is from a different line. However, having already received a critical data beat, the requested data value can be provided to the processor, even if that data beat is subsequently overwritten.

In some embodiments, said receiving circuitry receives an indicator with said incoming data beat, to indicate whether said incoming data beat is a critical data beat. The indicator can be used to determine whether a requested data value is to be found in the received data, which should then be forwarded to the processor. In some embodiments, said indicator is suppressed when said incoming data beat is sent as part of an entire cache line over a number of contiguous cycles.

In some embodiments, said data processing apparatus comprises said cache circuitry.

In accordance with another example configuration there is provided a data processing system comprising: cache circuitry comprising a plurality of cache lines; load/store circuitry comprising: a plurality of storage elements; and receiving circuitry configured to receive an incoming data beat from said cache circuitry and to store said incoming data beat in one of said storage elements, wherein if said incoming data beat belongs to a different cache line of said cache circuitry to an existing data beat stored in said plurality of storage elements, said existing data beat is replaced by said incoming data beat, otherwise said incoming data beat is stored and said existing data beat is kept; and communication circuitry to enable communication between said cache circuitry and said load/store circuitry.

In this example configuration, communication circuitry is provided in order to enable communication between the cache circuitry and the load/store circuitry. The cache circuitry is therefore able to provide a requested cache line over a number of data beats to the load/store circuitry. As data beats are received by the receiving circuitry, they are stored into the plurality of storage elements in the load/store circuitry. In particular, if a received data beat belongs to a different cache line to another existing data beat that is already in one of the plurality of storage elements then the existing data beats are replaced by the incoming (received) data beat. Otherwise, both data beats are stored in the storage elements.

In some embodiments, said incoming data beat is a critical data beat; and said incoming data beat is transmitted to said load/store circuitry before at least one other value in a same one of said plurality of cache lines is available in response to said communication circuitry being unused. In such embodiments, a critical data beat is sent to the load/store circuitry, even if the rest of the cache line is not yet available to be sent to the load/store circuitry. However, this may only happen if the communication circuitry is otherwise unused. This allows critical data beats to be sent opportunistically—when the communication circuitry would otherwise go unused. This helps to avoid wastage of bandwidth so that data is being transmitted where possible. By sending the critical data beat even before other data beats in the same cache line are available, the specifically required data can be provided to the processor more quickly than if the entire cache line must become available before any data beat in that cache line is transmitted to the load/store circuitry.

In some embodiments, said incoming data beat is inhibited from being transmitted to said load/store circuitry before at least one other value in a same one of said plurality of cache lines is available, when said incoming data beat is transmitted to load/store circuitry by a prefetch request. Prefetching is a process by which data is retrieved from a lower level of the memory hierarchy (such as a larger/slower cache or even main memory itself) before it is explicitly required. This can be efficient since it means that when the data is explicitly required, it can be retrieved more quickly because the slow process of obtaining the data has already been started. Indeed, the process may even have been completed, causing the data to be stored in a higher level cache. However, in such cases, because the data has not yet been explicitly requested, there may be no need to urgently provide the data. Consequently, the previously described mechanism of opportunistically forwarding the critical data beat can be avoided, thereby reducing bandwidth.

Particular embodiments will now be described with reference to the figures.

FIG. 1 illustrates a data processing system 100, which includes a load/store circuitry or unit 110 (an example of a data processing apparatus) and a level two cache 120 (an example of cache circuitry). Also present is a level one cache 130 (an example of further cache circuitry), which may form part of the data processing apparatus 110 or the data processing system 100, or may be a separate element altogether. As illustrates, the level one cache 130 is smaller than the level two cache 120 in that it can store less data. However, the level one cache 130 is faster than the level two cache 120 in that it requires less time to get a response.

In this example, it is assumed that a data value is requested by a processor via the load/store circuitry 110. The requested data misses (is not found) in the level one cache 130, but hits (is found) in the level two cache 120. Consequently, the cache line containing the requested data value is retrieved from the level two cache 120 (or lower in the memory hierarchy if the data is not held by the level two cache). Since the cache line is bigger than the interface between the load/store circuitry 110 and the level two cache 120, the cache line is transmitted in a number of data beats. Communication circuitry 140 in the level two cache 120 controls this process, and each data beat is received by receiving circuitry 150 in the load/store circuitry 110. An indicator can be set to indicate whether or not the data beat is a critical beat, i.e. if the particular data beat contains a data value that has been explicitly requested. Such an indicator is suppressed when the critical data beat is being sent as part of an entire cache line over several cycles. The indicator can therefore be used where a critical data beat is sent in isolation in order to indicate that there is a requested data value in the data beat that should be provided to the processor. Once specifically requested data has been received by the load/store circuitry 110, it can be sent on to the processor by fulfillment circuitry 175.

As each data beat is received by the receiving circuitry 150 it is stored into one of the storage elements 160A, 160B, 160C. When all the data beats belonging to the same cache line are stored in the storage elements 160A, 160B, 160C, they are written out to the level one cache 130 by fill circuitry 170.

Also in this embodiment, the number of storage elements is limited to the number of storage elements to store one cache line, plus one incoming data beat.

Figure 2:
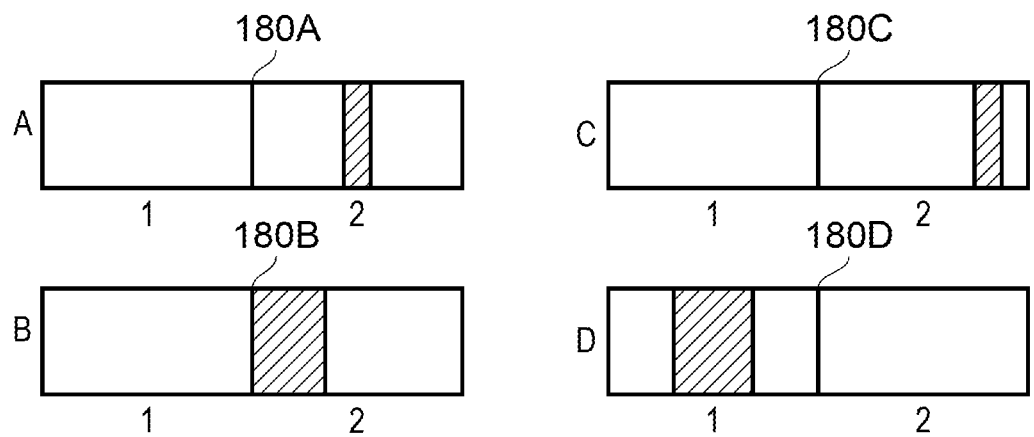
FIG. 2 diagrammatically illustrates the relationship between a cache line, a data beat, and a data value.

FIG. 2 illustrates an example of four cache lines (A-D) 180A, 180B, 180C, 180D. Each of the cache lines 180A, 180B, 180C, 180D is split up into two data beats. In other words, the size of a cache line is twice the size of the interface between the level two cache 120 and the load/store circuitry 110. Consequently, each cache line must be sent as two data beats. FIG. 2 also illustrates the concept of critical data beats. In particular, the explicitly requested data is shown as a hatched area in each of the cache lines 180A, 180B, 180C, 180D. The data beat containing the requested data is a critical data beat. Accordingly, for cache line A 180A, the second data beat is the critical data beat. For cache line B 180B, the second data beat is the critical data beat. For cache line C 180C, the second data beat is the critical data beat. Finally, for cache line D 180D, the first data beat is the critical data beat.

There are a number of ways that the storage elements 160A, 160B, 160C can be organised. However, in some embodiments, they are organised as a staging element into which received data is stored, and a number of other storage elements designed to collectively store exactly one cache line, with each storage element storing a single data beat.

Figure 3A:
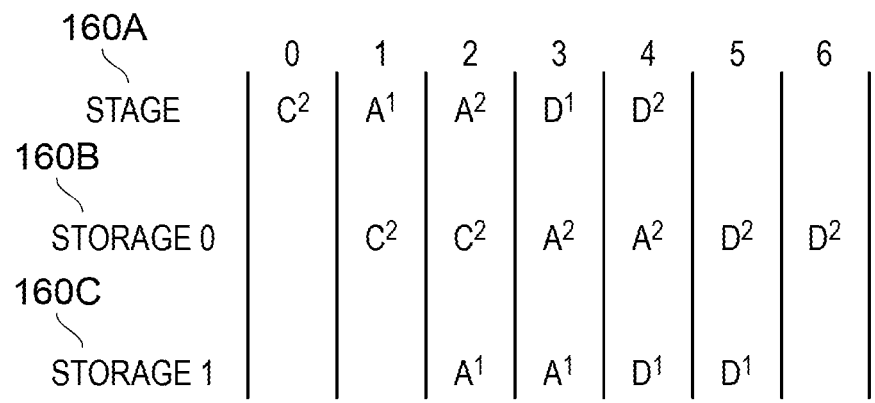
FIG. 3A shows the movement of data beats between a plurality of storage elements in accordance with one embodiment.
Figure 3B:
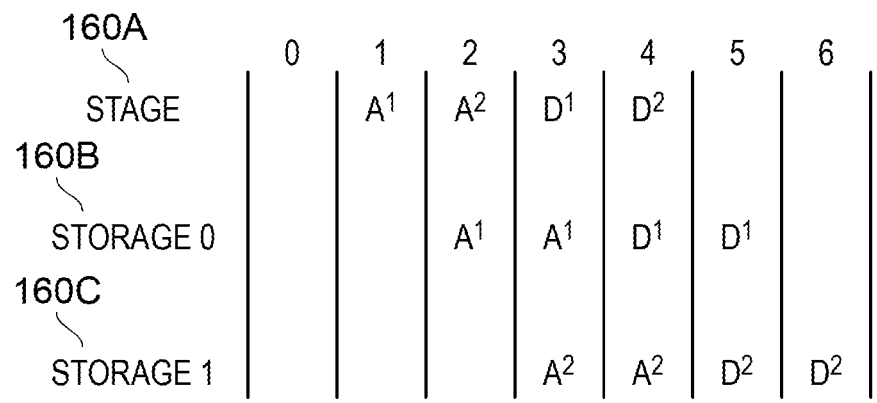
FIG. 3B shows the movement of data beats between a plurality of storage elements in accordance with one embodiment.

FIGS. 3A and 3B illustrate first and second examples of receiving data beats and storing them in the storage elements 160A, 160B, 160C in the data processing apparatus 110 of FIG. 1. Each of the letters A, B, C, and D are used to illustrate a data beat belonging to one of cache lines A-D (e.g. as shown in FIG. 2). The superscript number 1 or 2 indicates whether the data beat is the first data beat or the second data beat of that cache line. Meanwhile, the numbers 0-5 indicate the cycle number.

In FIG. 3A, in a cycle 0, the second data beat (or data chunk) of cache line C is received into the staging element 160A. In a cycle 1, with there being no other data beats stored in other storage elements, the data beat $C^2$ is stored in storage element 0. At the same time, the first data beat of cache line A is received into the stage element 160A. In a cycle 2, the received (incoming) data beat $A^1$ is stored in storage element 1 160C. In this way, data is moved from the staging element into an unused storage element where possible. At the same time, the second data beat $A^2$ is received into the staging element (i.e. a line fill of cache line A has occurred). In a cycle 3, the received data beat $A^2$ cannot be moved into an empty storage element. Consequently, the received data beat $A^2$ overwrites a data beat belonging to a different cache line (i.e. $C^2$). Consequently, $A^1$ and $A^2$ are stored together in storage element 0 160B and storage element 1 160C. At the same time, the first data beat of a cache line D is received into the staging element 160A. At a cycle 4, because all of the elements of a cache line (A) have been received, the cache line is written out, e.g. to the level one cache 130. This starts in cycle 4 with $A^1$ and concludes in cycle 5 with $A^2$. With data beat $A^1$ being written out, storage element 1 160C is therefore unused. Consequently, newly received data beat $D^1$ is stored in the storage element 1 160C. At the same time, an incoming data beat $D^2$ is received into the staging element 160A. In a cycle 5, with storage element 160B now unused, $D^2$ is stored in storage element 0 160B. Finally, in a cycle 6, the process of writing out cache line D occurs starting with $D^1$.

Note, therefore, that during cycle 3, a partially received cache line (C) is overwritten with a data beat $A^2$ belonging to a different cache line (A). Consequently, there is no obligation to wait for the remainder of cache line C to be received before cache line A can be received.

In FIG. 3A, a policy is followed in which critical data beats are sent provided that the communication circuitry 140 is not otherwise engaged. In other words, the critical data beats are transmitted opportunistically. This is true even if the entirety of the cache line is not yet ready. As a consequence, the data beat $C^2$ is transmitted in cycle 0 because this data beat is critical (as shown in FIG. 2), even though the entirety of cache line C is not available to transmit (since the next data beats to be transmitted are $A^1$ and $A^2$). However, a different policy can require that for prefetched data, critical data beats are not even transmitted in an opportunistic manner (e.g. even if the communication circuitry 140 is not otherwise engaged).

FIG. 3B shows the difference when the all of the data is prefetched. In this case, in cycle 0 since only the second (critical) data beat of cache line C is ready (as before), no data beats of cache line C are transmitted. As a consequence, if no data is yet ready (as is the case in cycle 0) no data is transmitted. Thereafter, both data beats for each cache line are received in concurrent cycles. For example, both data beats of cache line A are received in cycles 1 and 2. Both data beats of cache line D are received in cycles 3 and 4.

In both FIG. 3A and FIG. 3B each received data beat is held for two cycles (the length of the pipeline necessary to write out the data). By providing only two storage elements, plus a staging element, it is possible to achieve a non-stop fill without requiring excessive storage.

Figure 4:
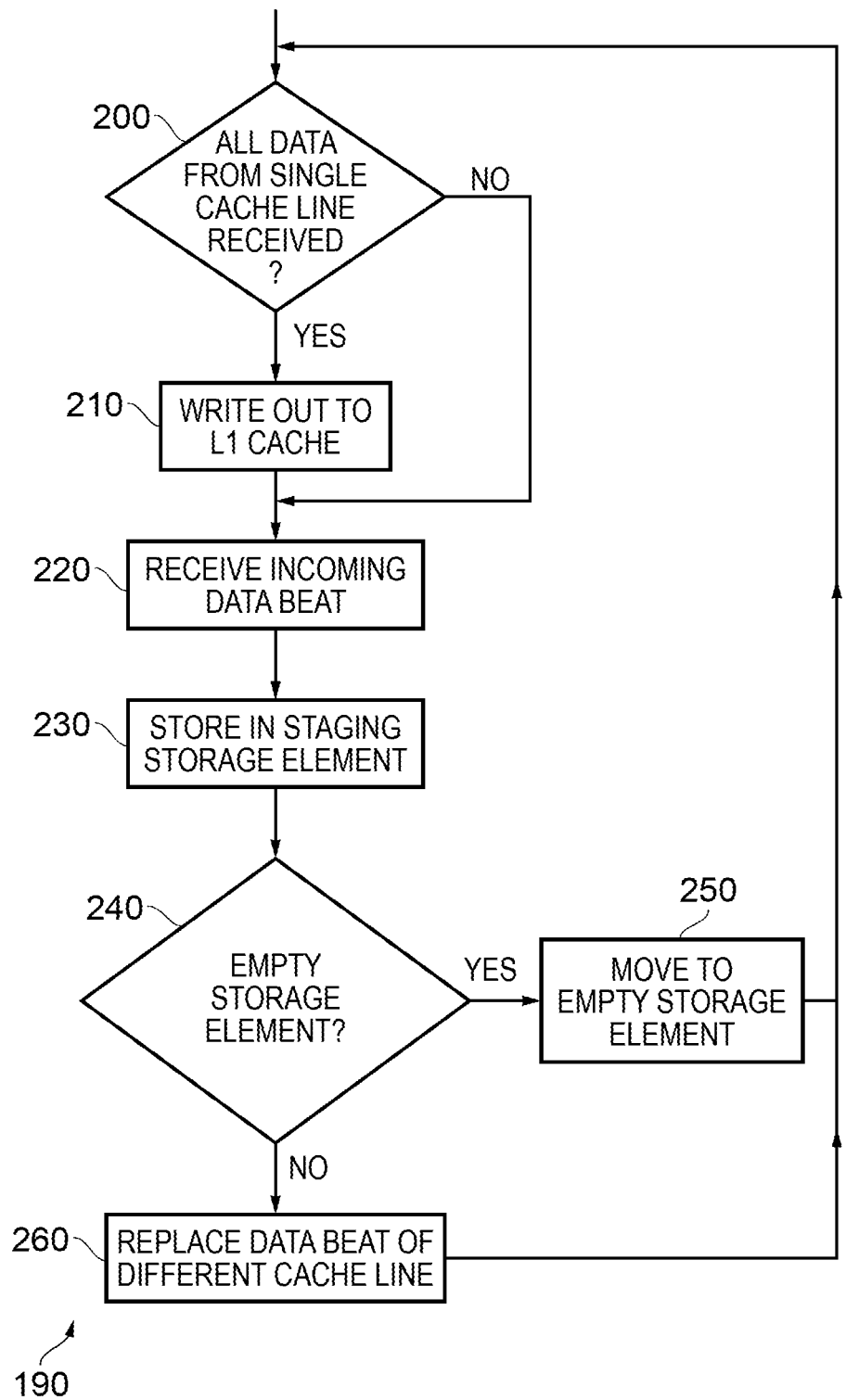
FIG. 4 shows, in flow chart form, a method of data processing in accordance with one embodiment.

FIG. 4 shows a flow chart 190 that illustrates a process of receiving data beats. At step 200, it is determined whether all the data beats from a single cache line has been received. If so, then at step 210, those data beats forming a single cache line are marked to be written out to the level one cache. The process of writing out the data beats occurs over the next cycles, with one data beat being written out per cycle. Flow then proceeds to step 220. If not, then flow proceeds directly to step 220. At step 220, an incoming data beat is received. At step 230, the incoming data beat is stored/received into the (staging) storage element 160A. At step 240, it is determined whether or not there is an empty other storage element. If so, then at step 250, the received data beat (now in the staging element) is moved to an empty storage element and flow returns to step 200. Otherwise, at step 260, the data beat replaces existing data beats from a different cache line than the received data beat and flow then proceeds back to step 200. Where the number of storage elements (excluding the staging element) is limited to holding data from a single cache line, a partially complete cache line will be overwritten by a full cache line that is subsequently received.

Figure 5:
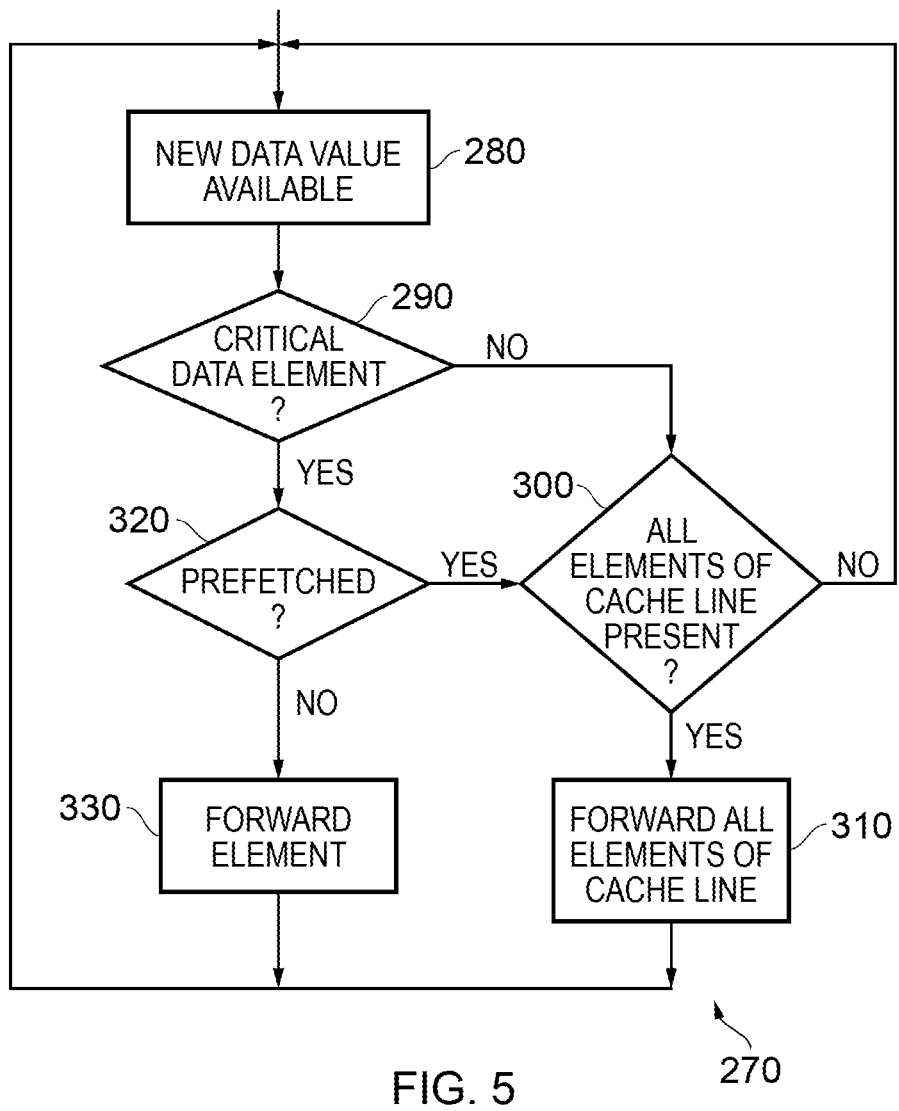
FIG. 5 shows, in flow chart form, a method of data processing in accordance with one embodiment.

FIG. 5 illustrates a method of data processing in accordance with one embodiment in the form of a flow chart. This process might be performed, for example, by the communication circuitry 140 of the level two cache from which data beats are being received. The process begins at a step 280 where new data becomes available. At a step 290, it is then determined whether the data element is critical or not. If not, then at step 300, it is determined whether all the elements (data beats) of the cache line are present or not. If not, there is nothing to send at this time, and so the process returns to step 280. Otherwise, all elements of the cache line are forwarded (one data beat at a time) at step 310, and the process then returns to step 280. If, at step 290, it is determined that the data beat is critical, then it is determined whether or not the data beat was prefetched or not at step 320. If the data was prefetched, then the process proceeds to step 300 where it is determined whether or not all elements of the cache line are present or not. In other words, even if the data beat is critical, then if the data beat was prefetched, it will only be sent if the entirety of the cache line is ready to be transmitted. Otherwise, if it is determined that the data is not prefetched at step 320, then the process proceeds to step 330 where the data beat is forwarded opportunistically, i.e. when the communication circuitry 140 is not otherwise engaged. As a consequence, non-prefetched critical data beats are forwarded opportunistically. The flow then returns to step 280.

The consequence of this behaviour, coupled with the fact that data may be removed from the storage element if a data beat from another cache line is subsequently received means that a critical data beat might be transmitted twice (if not prefetched). However, this gives the fulfillment circuitry 175 the chance to quickly return the requested data, thereby reducing the chances of the processor being slowed or stalled while waiting for data to be returned. Once the entirety of the cache line becomes available, it will be transmitted a second time, and subsequently written out to the level one cache 130 by the fill circuitry 170. At the same time, a limited amount of storage space can be provided in the load/store circuitry 110, thereby reducing power consumption and circuit space. At the same time, a number of outstanding misses can be handled, with the data beats being retrieved from lower in the memory hierarchy.

The above embodiments demonstrate a mechanism in which the amount of storage in a load/store unit can be reduced or even minimised while avoiding large increases in latency. Since the storage elements are not dedicated to particular cache lines, a partially complete cache line in the load/store unit will be overwritten if a complete cache line is subsequently sent. Critical data beats that are not prefetched are sent opportunistically so that they can be sent on to the processor quickly. However, the fact that a partially complete cache line could be overwritten means that a critical data beat might be sent more than once.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
a plurality of storage elements; and
receiving circuitry configured to receive a plurality of incoming data beats from cache circuitry and to store said incoming data beats in said storage elements, wherein
at least one existing data beat in said storage elements, previously received and stored as an incomplete cache line for which further data beats to complete the incomplete cache line are expected to be received by said receiving circuitry, is replaced by an equal number of said incoming data beats belonging to a different cache line of said cache circuitry prior to the incomplete cache line having been completed by the further data beats being received by the receiving circuitry.

2. A data processing apparatus according to claim 1, wherein
each storage element stores a single data beat.

3. A data processing apparatus according to claim 1, wherein
each cache line in said cache circuitry comprises a plurality of data beats.

4. A data processing apparatus according to claim 1, wherein
each cache line in said cache circuitry comprises two data beats.

5. A data processing apparatus according to claim 1, wherein
said data beat comprises an instruction.

6. A data processing apparatus according to claim 1, wherein
said existing data beat is a critical data beat.

7. A data processing apparatus according to claim 1, wherein
said data processing apparatus comprises said cache circuitry.

8. A data processing apparatus according to claim 1, wherein
said receiving circuitry receives an indicator with said incoming data beat, to indicate whether said incoming data beat is a critical data beat.

9. A data processing apparatus according to claim 8, wherein
said indicator is suppressed when said incoming data beat is sent as part of an entire cache line over a number of contiguous cycles.

10. A data processing apparatus according to claim 1, wherein
said plurality of storage elements comprises a staging element; and
when said incoming data beat is stored, it is firstly stored in said staging element before being moved to another of said plurality of storage elements.

11. A data processing apparatus according to claim 10, wherein
said plurality of storage elements consists of said staging element and a set of further storage elements, wherein said set of further storage elements is configured to store a single cache line from said cache circuitry.

12. A data processing apparatus according to claim 1, comprising:
fill circuitry to cause, in response to receiving all data beats belonging to a single cache line, said single cache line to be stored in further cache circuitry and said all data beats belonging to a single cache line to be removed from said plurality of storage elements.

13. A data processing apparatus according to claim 12, wherein
said fill circuitry is configured to perform non-stop filling once said cache circuitry has acquired all data beats belonging to a cache line from when said cache circuitry transmits a first data beat belonging to said cache line until said cache circuitry transmits a last data beat belonging to said cache line.

14. A data processing apparatus according to claim 13, wherein
said storage elements consist of a number of storage elements necessary to store a single cache line.

15. A data processing apparatus according to claim 13, wherein
said cache circuitry is at the level of a L2 cache or lower in a memory hierarchy; and
said further cache circuitry is a L1 cache.

16. A data processing system comprising:
cache circuitry comprising a plurality of cache lines; and
load/store circuitry comprising:
a plurality of storage elements; and
receiving circuitry configured to receive a plurality of incoming data beats from said cache circuitry and to store said incoming data beats in said storage elements, wherein
at least one existing data beat in said storage elements, previously received and stored as an incomplete cache line for which further data beats to complete the incomplete cache line are expected to be received by said receiving circuitry, is replaced by an equal number of said incoming data beats belonging to a different cache line of said cache circuitry prior to the incomplete cache line having been completed by the further data beats being received by the receiving circuitry.

17. A data processing system according to claim 16, wherein
said incoming data beat is a critical data beat; and
said incoming data beat is transmitted to said load/store circuitry before at least one other value in a same one of said plurality of cache lines is available in response to said communication circuitry being unused.

18. A data processing system according to claim 17, wherein
said incoming data beat is inhibited from being transmitted to said load/store circuitry before at least one other value in a same one of said plurality of cache lines is available, when said incoming data beat is transmitted to load/store circuitry by a prefetch request.

19. A method comprising:
receiving a plurality of incoming data beats from cache circuitry; and
replacing at least one existing data beat previously received and stored as an incomplete cache line for which further data beats to complete the incomplete cache line are expected to be received, by an equal number of said incoming data beats belonging to a different cache line of said cache circuitry prior to the incomplete cache line having been completed by the further data beats being received.

* * * * *